UNITED STATES PATENT OFFICE.

EMIL RUEFF, OF NEW YORK, N. Y.

METHOD OF MAKING ALKALINE MAGNESITE.

SPECIFICATION forming part of Letters Patent No. 675,018, dated May 28, 1901.

Original application filed August 3, 1898, Serial No. 687,595. Divided and this application filed June 23, 1899. Serial No. 721,616. (Specimens.)

*To all whom it may concern:*

Be it known that I, EMIL RUEFF, a resident of the borough of Manhattan, city, county, and State of New York, have invented certain new and useful Improvements in Producing Alkaline Magnesite, of which the following is a specification.

This application is a division of Serial No. 687,595, filed by me August 3, 1898.

This invention relates to improvements in fireproofing and heat and sound insulating media, and has for its object to produce a method of making a compound suitable to be used for building-blocks, boiler-coverings, and in like situations where a non-conducting fireproof compound is desirable.

To this end the invention consists in the process hereinafter set forth and claimed.

In carrying out my invention I produce a compound of magnesia different from the ordinary carbonate of magnesia of commerce in that it has a greater percentage of water than the said ordinary carbonate of magnesia. The carbonate of magnesia of commerce is either the light carbonate of magnesia, the heavy carbonate of magnesia, or the mineral magnesite, the normal carbonate of magnesia $MgO,CO_2$. The light carbonate of magnesia may be said to have the following two formulæ:

$$3MgO,2CO_2+3H_2O$$

or $$4MgO,3CO_2+4H_2O,$$

which latter formula also represents the composition of heavy carbonate of magnesia of commerce. The basic or alkaline carbonates which I produce contain more water and are in part indicated by the following formulæ:

$$3MgO,2CO_2+5H_2O.$$

$$7MgO,2CO_2+10H_2O.$$

$$3MgO,1CO_2+4H_2O.$$

$$5MgO,2CO_2+8H_2O.$$

$$6MgO,1CO_2+8H_2O.$$

$$4MgO,2CO_2+5H_2O.$$

This new carbonate of magnesia I shall hereinafter designate as "alkaline magnesite."

In producing alkaline magnesite I may proceed in various ways. One way to produce alkaline magnesite is as follows: I mix one part of powdered calcined magnesite with twenty parts of water and conduct to such mixture while in a state of agitation carbonic-acid gas under a pressure of about twenty-five pounds per square inch, until the mixture has absorbed less than one part, by weight, of the carbonic-acid gas, so as to prevent the formation of a normal carbonate of magnesia ($MgO,CO_2$) or any of its hydrates. The whole mass is then heated gradually to a temperature less than or preferably to about 160° Fahrenheit, drained, dried, and may then be compressed under a pressure of from two hundred to one thousand pounds per square inch into the desired shape. The article thus obtained is a carbonate of magnesia which contains less carbonic acid and more chemically-bound water than any other corresponding commercial carbonate of magnesia heretofore produced. The alkaline magnesite thus obtained differs from the ordinary magnesite in that it contains in proportion to its magnesia less carbon dioxid than ordinary magnesite and also in that it contains chemically-combined water which is not present in ordinary magnesite. The ordinary magnesite is a heavy and dense mineral, while the article which I produce is a very finely divided and light product which forms porous lumps in the presence of water.

The excess of chemically-bound water and the method of preparing the mass vastly improves the condition of the substance. It is very light in weight, and, unlike all other articles of the same class, it possesses great tensile strength and elasticity and is able to withstand not only the roughest handling, but also the severest test to which any building material used for lining interior walls, ceilings, &c., may be subjected. This substance has great resistance to the influence of heat and may be used for fireproofing, and being a non-conductor of sound may be also used as an insulating-lining for covering walls, ceilings, ice-boxes, safes, &c., and may be used as a pipe or boiler covering. This substance, which I have called "alkaline magnesite," is claimed by me in another application for patent filed August 7, 1899, Serial No. 726,409.

What I claim, and desire to secure by Letters Patent, is—

1. The herein-described process of producing alkaline magnesite containing an excess of chemically-bound water which consists in acting upon calcined magnesite in the presence of water with less carbon dioxid than is necessary to produce a normal carbonate, heating the mass at a temperature not higher than 160° Fahrenheit and drying the mass and finally compressing it into the desired form.

2. The herein-described process of producing alkaline magnesite containing less carbonic acid than corresponding normal magnesite and an excess of chemically-bound water which consists in mixing one part of calcined magnesite with about twenty parts of water and conducting to such mixture while in a state of agitation carbonic-acid gas at a pressure of about twenty-five pounds to the square inch until the mixture has absorbed less than one part by weight of carbonic-acid gas so as to prevent the formation of a normal carbonate of magnesia, heating the mass to a temperature of about 160° Fahrenheit, thereupon draining the mass and thereupon drying and compressing the said mass into the desired shape.

EMIL RUEFF.

Witnesses:
  CHARLES E. SMITH,
  MAURICE BLOCK.